United States Patent [19]

Iwashita et al.

[11] Patent Number: 5,326,503
[45] Date of Patent: Jul. 5, 1994

[54] LATTICED PACKING MEMBER FOR GAS-LIQUID CONTACTORS

[75] Inventors: Koichiro Iwashita; Takakazu Sunada; Makiichi Ishihara, all of Tokyo; Sunao Ushio, Kanagawa; Kouichi Shinohara, Kanagawa; Takami Yamada, Kanagawa, all of Japan

[73] Assignees: Mitsubishi Jukogyo Kabushiki Kaisha; Kabushiki Kaisha Meiji Gomu Kasei, both of Tokyo, Japan

[21] Appl. No.: 95,518

[22] Filed: Jul. 26, 1993

[30] Foreign Application Priority Data

Jul. 30, 1992 [JP] Japan .................. 4-059006

[51] Int. Cl.$^5$ .................. B01F 3/04
[52] U.S. Cl. .................. 261/112.1
[58] Field of Search .................. 261/112.1, 111

[56] References Cited

U.S. PATENT DOCUMENTS

| | | | |
|---|---|---|---|
| 3,039,749 | 6/1962 | Kohl et al. | 261/112.1 |
| 3,227,429 | 1/1966 | Renzi | 261/112.1 |
| 3,430,935 | 3/1969 | Garrett | 261/111 |
| 3,969,447 | 7/1976 | Glitsch et al. | 261/112.1 |
| 4,728,468 | 3/1988 | Duke | 261/111 |

FOREIGN PATENT DOCUMENTS 1626538  8/1971  Fed. Rep. of Germany ... 261/112.1

*Primary Examiner*—Tim Miles
*Attorney, Agent, or Firm*—Nikaido, Marmelstein, Murray & Oram

[57] ABSTRACT

A latticed packing member for gas-liquid contacting system having an odd number of plural longitudinal strips and an even number of plural lateral strips, the latter number being one less the number of the longitudinal strips. These strips are crossed at right angles on their sides, and the bottom thereof is chamfered. At least one projected area is provided on the strips, on which a notch for engagement is formed. At the center of lattice sections other than sections provided with the projected areas, there is provided a reinforcement with a flat bottom. The longitudinal strip located at the center of the member coincides with the axial center line X of the lateral strip in the direction A of its length, and the axial center line Y of the longitudinal strip in the direction B of its length is formed by the lateral strip which passes the center of the lateral lattice section located at the center. The axial center lines X and Y intersect with each other at the center.

6 Claims, 3 Drawing Sheets

LATTICED PACKING MEMBER FOR GAS-LIQUID CONTACTORS

BACKGROUND OF THE INVENTION

The present invention relates to a packing member for gas-liquid contactors used in gas-liquid contact operations of a chemical reaction apparatus such as a cooling tower and an absorption tower. More particularly, it relates to a lattice packing member which can be stacked in plural layers by alternately arranging the layers at right angles with respect to the layer immediately adjacent thereto.

Air contaminants such as sulfur dioxide contained in the exhaust gas from thermal power stations are generally removed by passing the gas through a gas-liquid contactor. In a chemical reaction apparatus such as the system for desulfurizing flue gas using lime and gypsum, various packing members are used to improve the gas-liquid contact efficiency. A structure consisting of plural strips that are crossed to form a lattice is known as one such packing member. For example, plural longitudinal strips A standing upright on their edges are arranged in parallel and are crossed at right angles with plural lateral strips B also standing upright on their edges, to thereby form an integral lattice structure.

There are two types of packing member with such lattice structure. One consists of a greater number of longitudinal strips A than lateral strips B, the latter being arranged at a larger interval. Thus, the openings in the lattice structure seen in a plan view are formed as a rectangle as in Japanese Patent Application Laid-Open No. Sho 50-116372. The other consists of an equal number of longitudinal and lateral strips arranged in a criss-cross manner so that the openings in the lattice structure are formed as a square, as disclosed in Japanese Utility Model publication No. Sho 56-51923. These latticed packing members are made of injection-molded plastics and are stacked and installed inside a flue gas desulfurizing system.

In a gas-liquid contactor loaded with such packing members, contaminants are removed from the flue gas as the gas and liquid are contacted. As such, the flow pressure of the gas and the gas-liquid contact efficiency play an important role. Preferably, a packing member should be capable of preventing flow pressure and loss, achieving uniform gas flow, and promoting well-balanced and uniform distribution of gas and liquid in order to effect uniform chemical reactions. Further, they need to have sufficient strength as plural members are stacked one upon the other to facilitate easy loading into the system, and be free of lateral displacement.

In the lattice structure mentioned above in which the lattice openings are formed as a rectangle by allowing a larger interval for the lateral strips B than the longitudinal strips A, flow pressure loss of gas can be reduced. However, because of the larger interval of lateral strips B, the amount of liquid which comes in contact with and flows down along the packing member is small, making the contact efficiency of liquid far from satisfactory. With the other latticed packing member having square openings, one packing member is stacked on another member with an interval secured therebetween by means of projections provided at each junction of the lattice structure. Such packing member makes it difficult to load the same inside a system as the projections get in the way as the member is slid inside, involving troublesome manipulation for loading.

SUMMARY OF THE INVENTION

The present invention has been contrived in view of the situation mentioned above and aims at providing a latticed packing member for gas-liquid contacting system which minimizes flow pressure loss of the gas and improves the contact efficiency of gas and liquid.

Another object of the present invention is to provide a latticed packing member for gas-liquid contacting system which can be easily loaded inside the system.

Still another object of the present invention is to provide a high strength latticed packing member to prevent breaking when stacked in plural layers.

BRIEF DESCRIPTION OF THE DRAWINGS

These and other objects, features and advantages of the present invention will become apparent from the description below taking in conjunction with the attached drawings, wherein.

DESCRIPTION OF THE PREFERRED EMBODIMENT

Figure 1:
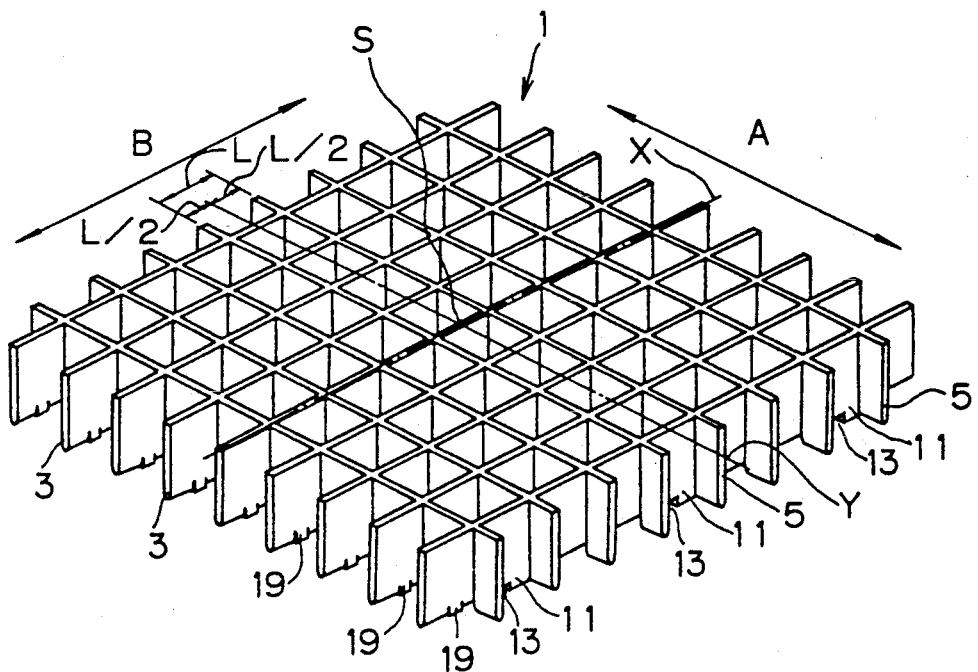
FIG. 1 is a perspective top view to show the latticed packing member according to the present invention.
Figure 2:
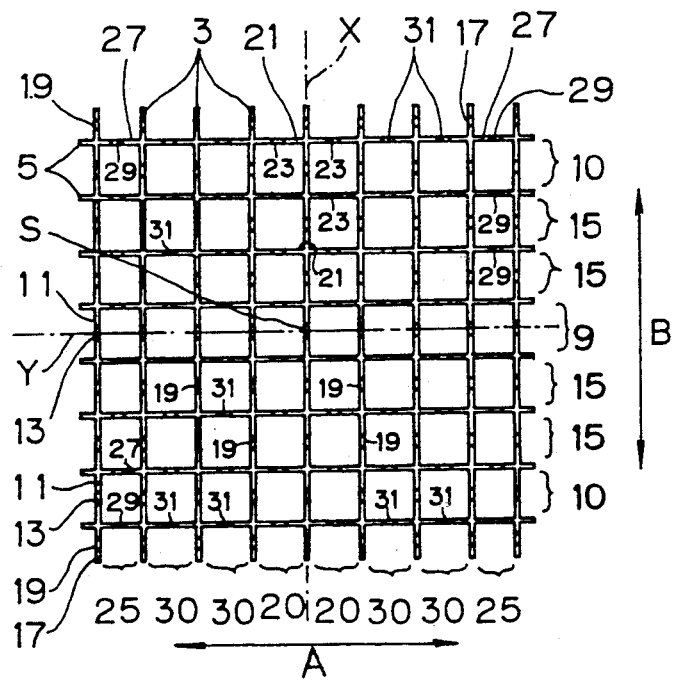
FIG. 2 is a bottom view of the latticed packing member according to the present invention.

To achieve these objects, the present invention has the following construction.

The latticed packing member comprises plural numbers of longitudinal strips and lateral strips. The strips made of plastics by injection molding. An odd number of longitudinal strips are arranged in parallel, while an even number of the lateral strips are arranged in parallel, the even number being one less than the odd number. The longitudinal and lateral strips are crossed at right angles with equal intervals.

The bottom of both the longitudinal and the lateral strips is chamfered and is formed with at least one projected area, on which a notch for engagement is made. A reinforcement member with a flat bottom is provided on the bottom of both the longitudinal and the lateral strips so that the strips except for the projected portions can be positioned within lattice sections. The longitudinal strip in the middle coincides with the axial center line X of the lateral strip in the direction A of its length. The axial center line Y in the direction B along the length of the longitudinal strip is formed by a lateral strip and passes the mid point of the lattice section of the lateral strip at the center in the direction of its length. The axial center lines X and Y intersect each other at the center of the latticed packing member.

The projected portions on the longitudinal and lateral strips are preferably provided on the lattice sections on both ends of each of the longitudinal and lateral strips. On the bottom of a lateral strip at the center may be provided a positioning projection that fits in a lateral lattice section at its center. A typical strip is 100 mm high, 4 mm thick, and 500 mm long.

The latticed packing member according to the present invention can be stacked in plural layers, but with each layer staggered by 90 degrees. This way, the node of lattices in one member will come at the center of a lattice opening of another member, minimizing the pressure loss of the flowing gas, facilitating well-balanced and uniform distribution of the gas and liquid, and improving the contact efficiency. The chamfered bottom of both the longitudinal and the lateral strips facilitates smooth liquid flow and prevents scale adhesion. The bottom is further provided with a reinforcement to ensure safe stacking of the packing members without buckling. As the top surface of the packing member is made flat and smooth, it can be easily slid inside the system for loading and positioning.

The present invention will now be described in more detail by referring to an embodiment thereof.

A latticed packing member 1 according to the present invention comprises plural longitudinal strips 3 and lateral strips 5. An odd number of plural longitudinal strips are in parallel arrangement, while there are provided an even number of lateral strips, the latter number being less than the number of the longitudinal strips by one. The longitudinal strips and lateral strips are crossed at right angles to form a latticed packing member. As the longitudinal and lateral stirps 3, 5 are substantially the same in size, the latticed packing member is generally shaped like a square in plan view. Lattice openings are formed by plural longitudinal and lateral strips that are crossed at right angles.

In the preferred embodiment, there are nine longitudinal strips 3, with a strip 3 in the middle being positioned on the axial center line X in the lateral direction of the member 1. On the other hand, there are provided lateral strips 5 in the even number which is less by one than the number of longitudinal strips, or eight strips 5 in the embodiment. The axial center line Y in the longitudinal direction passes the center of the lattice opening 9 positioned in the middle along the lateral direction. Given the width L of a lattice section 9 in the lateral direction, the length between the axial center line Y and an adjacent lateral strip 5 is L/2. Thus, the junction between the axial center lines Y and X coincides with the center S of the lattice packing member 1.

Lattice sections along the length of the lateral strip 5 defined by the longitudinal strips 3 and those along the length of the longitudinal strip 3 defined by the lateral strips 5 are the same in size. Thus, a lattice opening in plan view forms a square, except for the longitudinal lattice opening 25 on both ends in the longitudinal direction which are smaller. This is because, as the longitudinal strips 3 outnumber the lateral strips 5 by one, the longitudinal strips 3 on both extreme sides when arranged at an equal interval would be positioned at the tip end of the lateral strips 5, making the margin between the longitudinal strip 3 and the tip end of the lateral strip 5 extremely small. If this margin is very small, there will be left very little space between the two adjacent longitudinal strips when the packing members are disposed side by side in the lateral direction. In order to adjust the margin, the longitudinal strips 3 on both ends are moved slightly toward the center to somewhat narrow the lattice opening 25.

Figure 3:
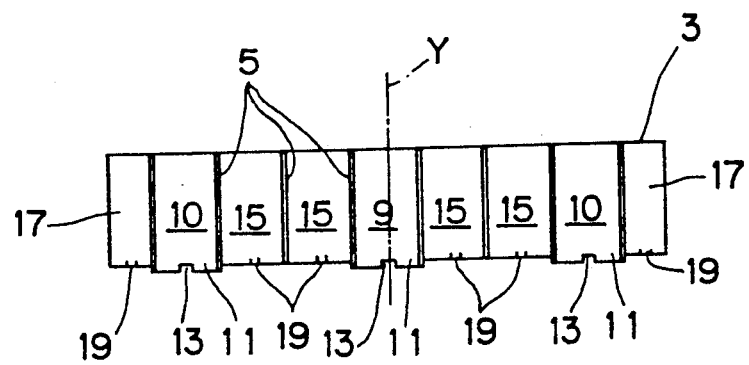
FIG. 3 is a front view to show a longitudinal strip.
Figure 4:
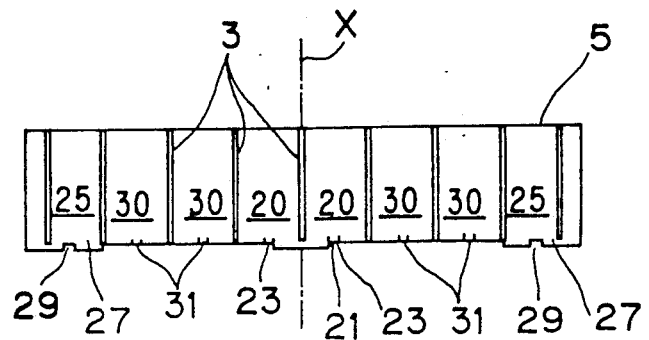
FIG. 4 is a front view to show a lateral strip.
Figure 5:
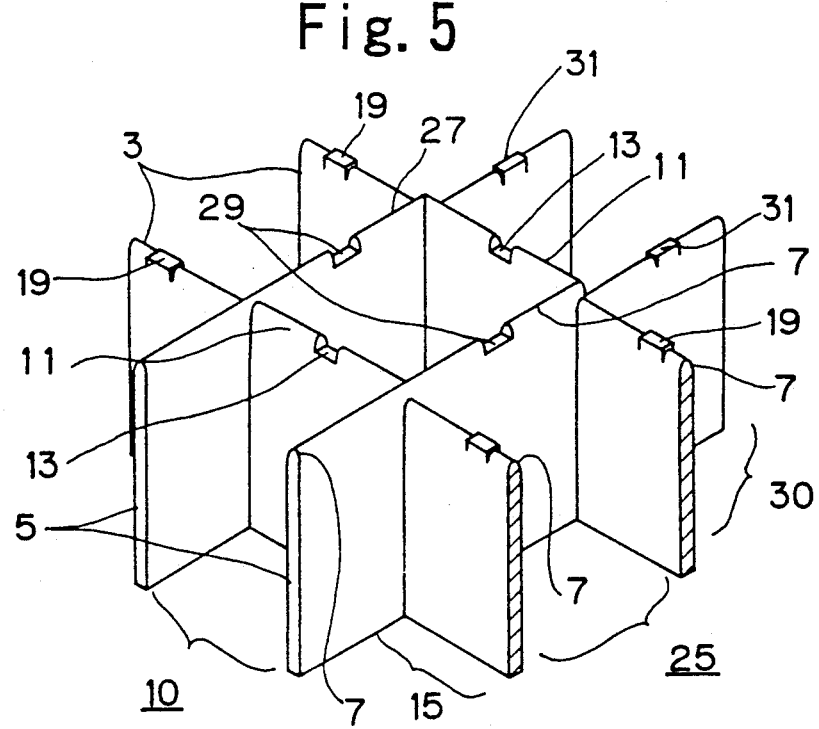
FIG. 5 is a partially enlarged bottom view of the latticed packing member according to the present invention.

The top edge of both the longitudinal and the lateral strips 3, 5 is formed flat, whereas the bottom thereof is formed as a chamfered face 7 to facilitate the liquid flow and to prevent scale adhesion (see FIG. 5). As shown in FIGS. 3 and 5, projected areas 11 are each provided at the bottom of the lattice section 9 of the longitudinal strip 3 where the axial center line Y passes and the lattice sections 10 on both sides in the lateral direction. Substantially at the center of the projected area 11, there is provided a notch 13 for engagement. When the latticed packing members are stacked, the upper edge of lateral strips 5 fits in the notch 13. The bottom of the projected area is chamfered similarly as the chamfered face 7. Additionally, reinforcements 19 are each formed substantially at the center of each lattice section 15 and the section at the tip end 17 of each longitudinal strip 3 extending beyond the lateral strip 5. The bottom of the reinforcement 19 is flush with the chamfered face 7 and is formed flat. The sides of the longitudinal strip 3 extend vertically to comprise the sides of the reinforcement 19. Unlike the chamfered face 7, therefore, the reinforcement 19 has the same thickness over its entire area.

There extends toward both directions from the mid point of each lateral strip 5 a positioning projection 21 where the longitudinal strip 3 coincides with the axial center line X. Both ends of the projection 21 reach as far as the substantial center of the adjacent longitudinal lattice sections 20, and the size of the projection 21 is such that it can be fitted within the lateral lattice section 9. Additionally, the reinforcements 23 are each formed at both ends of the projection 21. The longitudinal lattice section 25 and the section that extends therefrom toward the tip ends of the lateral strip 5 is projected (27) at the bottom and a notch 29 for engagement is formed at the bottom of the longitudinal lattice section 25. The bottom of the projected areas 21 and 27 is chamfered similarly as the projected area 11. The notch 29 has the same size as the notch 13. When the packing members are stacked, the upper edge of the longitudinal strip fits in the notch 29. Moreover, reinforcements 31 are each formed on the bottom of the longitudinal lattice sections 30 on the lateral strip 5 located between the longitudinal lattice sections 20 and 25. As the reinforcements 23 and 31 have the same shape as the reinforcement 19 formed on the longitudinal strip 3, detailed description is omitted.

Figure 6:
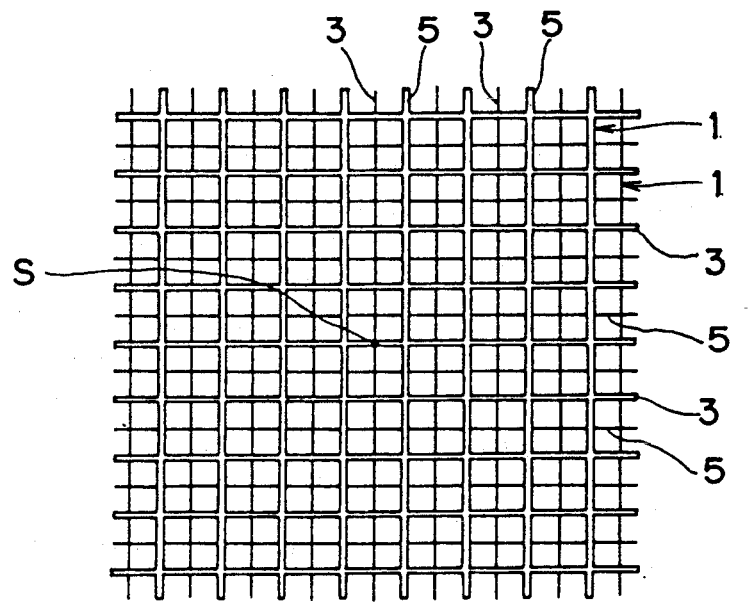
FIG. 6 is a plan view to explain the latticed packing members stacked in two layers; and, FIG. 7 is a side view to explain the latticed packing members stacked in three layers.
Figure 7:
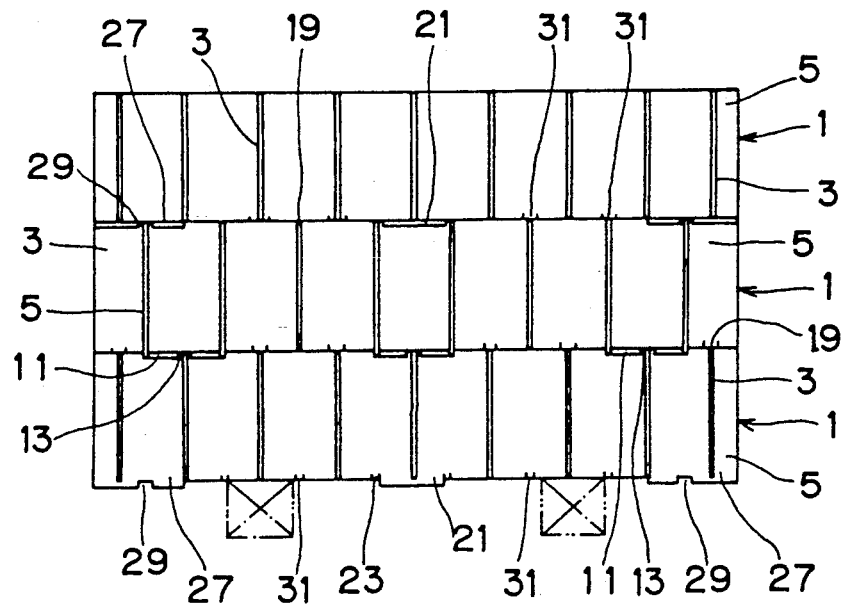

Referring now to FIGS. 6 and 7, the method of using the latticed packing member 1 according to the present invention will be described. FIG. 6 is a plan view to show the members stacked in two layers. The packing member in the lower layer is depicted in thick lines. FIG. 7 is a side view to show the members stacked in three layers.

First, when the packing members are stacked in two layers, the first layer member is staggered by 90 degrees in respect of the second layer member. This way, the positioning projection 21 located at the center of the bottom of the lateral strip 5 of the upper layer member fits in the lattice opening in the lateral lattice section 9 of the lower layer member. At the same time, the notch 29 provided in the projected area 27 receives the upper edge of the lateral strip 5 on both sides of the lower layer member. As the projected area 21 fits in the lattice opening of the lower layer member and the notch 29 receives the upper edges of the lateral strip 5 of the lower layer member, the packing members can be securely positioned in two layers and any displacement in the vertical direction can be prevented. The reinforcements 23 and 31 of the lateral strip 5 are placed at right angles on the upper face of the lateral strip 5 of the lower layer member.

The upper edge of the longitudinal strip of the lower layer member along the axial center line X fits in the notch 13 provided on the projected area 11 at the center as the upper layer member is placed at right angles on the lower layer member. At the same time, the notch 13 provided on the projected area 11 of the longitudinal strip 3 receives the upper edge of the longitudinal strip of the second row from the edge of the lower layer member which is disposed at right angles with respect to the upper layer member. In this way, lateral displacement can be prevented. The longitudinal strip 3 of the lower layer member fits in the notch 13 of the longitudinal strip 3 of the upper layer member, and the reinforcement 19 of the longitudinal strip 3 of the upper layer member is placed at right angles on the top face of the longitudinal strip 3 of the lower layer member. When stacking in three layers, the third layer member is turned by 90 degrees.

When the packing members are stacked as above by turning them by 90 degrees, they can be vertically stacked with the center S of the members 1 aligned. As a result, the junction between longitudinal and lateral strips 3, 5 of the upper layer member 1 becomes located at the center of each lattice opening of the packing member 1 in the lower layer. As shown in FIG. 6, each longitudinal strip 3 of the upper layer member passes the center of the lateral lattice section of the lower layer member, while each lateral strip 5 of the upper layer member passes the center of the longitudinal lattice section of the lower layer member. As spaces in the latticed packing member in plan view are formed uniformly, gas and liquid can be evenly distributed in a well-balanced manner to allow uniform chemical reaction. As the packing member 1 in the lower layer fits in the notch 13 or 29 and the reinforcements 19, 23 and 31 of the upper layer member 1 are mounted, steady flow of gas and liquid is assured and pulsating flow can be prevented.

It should be noted that the foregoing embodiment in no way limits the scope of the present invention. For example, the number of longitudinal or lateral strips can be arbitrarily increased or deceased, and the number and the position of the projections can be varied. The projection 21 provided at the center of the lateral strip can be omitted suitably depending on the need. Although the longitudinal lattice section on both ends of the lateral strip is made smaller than other lattice sections in the embodiment, all the lattice sections can be made the same.

What is claimed is:

1. A lattice packing member for gas-liquid contacting system comprising an odd number of plural longitudinal strips and an even number of plural lateral strips, the even number being one less the odd number of the longitudinal strips, wherein the longitudinal and lateral strips are crossed at right angles on their sides, the bottom of said longitudinal and lateral strips respectively is chamfered and has at least one projected area on which a notch is formed, a reinforcement with a flat bottom is provided at the center of lattice sections other than said sections with a projected area, the longitudinal strip located at the center of the latticed member coincides with the axial center line X of the lateral strip in the direction A of its length, a lateral strip constitutes the axial center line Y of the longitudinal strip in the direction B of its length which passes the center of the lateral lattice sections located at the center of the member, and said axial center lines X and Y intersect with each other at the center of the member.

2. The latticed packing member for gas-liquid contacting system as claimed in claim wherein said projected area is provided in the lateral lattice section of the longitudinal strips and longitudinal lattice section of the lateral strips both located on both edges of the member.

3. The latticed packing member for gas-liquid contacting system as claimed in claim 1 wherein said projected area of the lateral strips is provided on the longitudinal lattice section located on both edges and the section extending therefrom toward their tip end.

4. The latticed packing member for gas-liquid contacting system as claimed in claims 1, 2 or 3 wherein said longitudinal and lateral strips are respectively arranged in parallel at a regular interval.

5. The lattice packing member for gas-liquid contacting system as claimed in claims 1, 2 or 3 wherein, among the longitudinal lattice sections constituted by the longitudinal strips, those located on both edges of the lateral strips are made narrower than other lattice sections.

6. The latticed packing member for gas-liquid contacting system as claimed in any one of claims 1, 2, or 3 wherein a positioning projection that fits in the lateral lattice section located at the center of the longitudinal strip is formed on the bottom face of the lateral strip at its center.

* * * * *